July 8, 1969  H. C. COOK  3,453,716
METHOD OF MANUFACTURING PIPE SECTIONS FOR THE TRANSPORTATION
OF CRYOGENIC LIQUIDS
Filed Feb. 25, 1966  Sheet 1 of 2

INVENTOR.
HARRY C. COOK

BY
Donald F. Wohlers
ATTORNEY

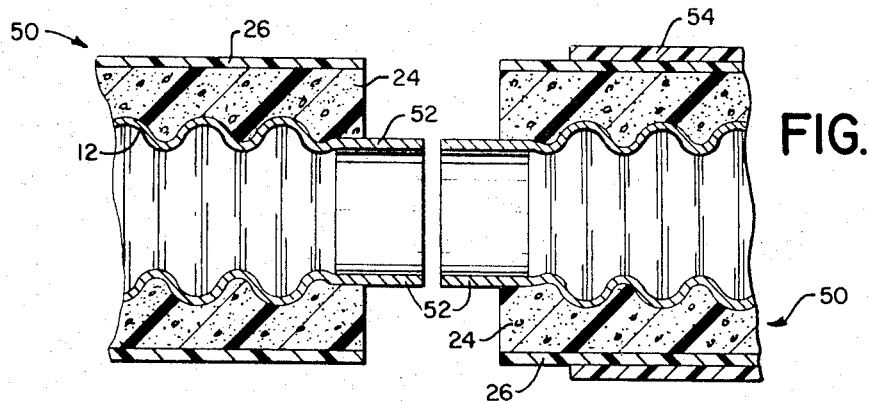
FIG. 4A
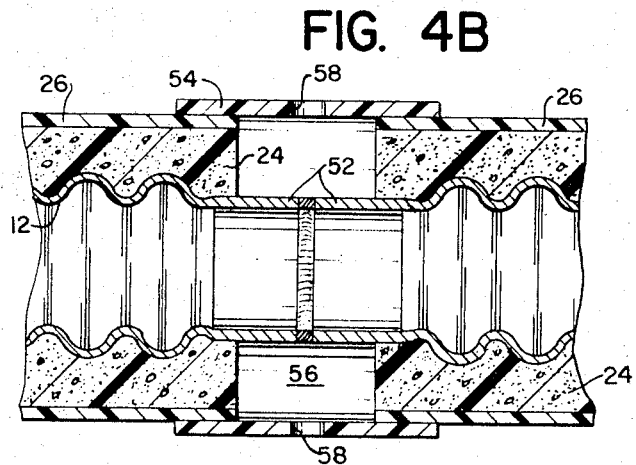
FIG. 4B
FIG. 5
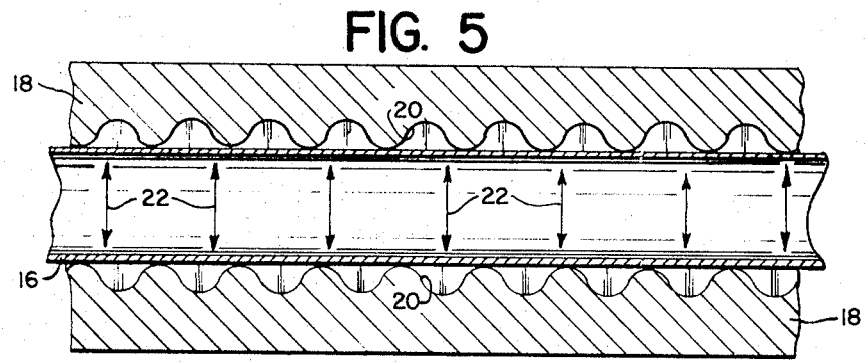
INVENTOR.
HARRY C. COOK
BY
*Donald F. Wohlers*
ATTORNEY

United States Patent Office 3,453,716
Patented July 8, 1969

3,453,716
METHOD OF MANUFACTURING PIPE SECTIONS FOR THE TRANSPORTATION OF CRYOGENIC LIQUIDS
Harry C. Cook, Orange, N.J., assignor to Esso Research and Engineering Company, a corporation of Delaware
Filed Feb. 25, 1966, Ser. No. 530,096
Int. Cl. F16l 9/14; B21d 39/00
U.S. Cl. 29—421                     3 Claims

ABSTRACT OF THE DISCLOSURE

A method of manufacturing insulated pipe wherein a low temperature resistant metallic material, such as 9% nickel steel, is corrugated, and thereafter sprayed with a polyurethane foam insulation. The outer surface of the insulation is subsequently smoothed and thereafter coated with a plastic vapor barrier sheath.

---

The present invention relates to pipelines.

More particularly, the present invention relates to pipelines capable of handling liquids at very low or cryogenic temperatures and capable of being situated at subsurface locations such as at underground or underwater locations.

One of the objects of the invention is to provide a pipeline of the above type which is capable of reliably resisting the pressure of the liquid while at the same time localizing longitudinal thermal contraction stresses, induced by the low temperature of the liquid, so that these stresses will not be transmitted through substantial distances along the pipe.

Also, it is an object of the invention to provide a pipeline of the above type which is capable of reliably insulating the liquid from heat losses while at the same time also capable of protecting the structure of the pipeline which prevents the heat losses.

Also, the objects of the present invention include the provision of a structure wherein successive sections of the pipeline are very reliably connected to each other.

Furthermore, it is an object of the invention to provide a pipeline which can include T's, elbows, or any other type of pipe section without sacrificing any of the above highly desirable features of the pipeline.

The objects of the invention also include a very efficient and reliable method of manufacturing the pipeline or sections thereof.

In particular, the pipeline of the invention includes an inner metallic liner which, in accordance with one feature of the invention, is circumferentially corrugated and which, while having a relatively thin wall, nevertheless is made of a material which enables this thin liner to handle very low temperature liquids without becoming brittle. The pipeline of the invention enables the liner to resist the pressures which are encountered from the hydraulic and static pressure of the liquid at the subsurface location of the pipeline. This metallic liner is surrounded by a layer of temperature-resistant insulation which is substantially thicker than and which directly engages the liner. This layer of insulation prevents heat losses so that a very low temperature of the liquid can be reliably maintained. Finally, the layer of insulation is itself surrounded by a protective plastic sheath which protects the insulation against crushing as well as from moisture penetration.

The invention is illustrated by way of example in the accompanying drawings which form part of the application and in which:

FIG. 4A illustrates one step in a method of joining the pipe sections together in accordance with the invention;

FIG. 4B shows a step in the method subsequent to that of FIG. 4A; and

FIG. 5 is a schematic representation of one manner in which corrugations can be formed in the metallic liner.

The pipeline of the invention is adapted to have a subsurface location so that it can be placed either underground or underwater, and it is intended to transport very cold liquids such as liquefied gases. Thus, the pipeline of the invention can transport liquefied oxygen, nitrogen, methane, natural gas, or the like.

Figure 1:
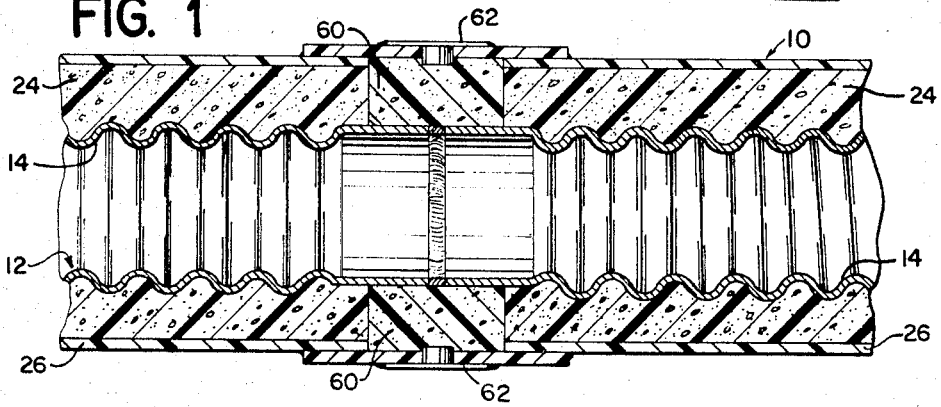
FIG. 1 is a fragmentary longitudinal sectional illustration of part of a pipeline according to the present invention, FIG. 1 showing a part of the pipeline where a pair of pipe sections thereof are joined together.

Referring to FIG. 1, it will be seen that the pipeline 10 of the present invention includes an inner metallic liner 12. The metallic liner 12 is formed with circumferential corrugations 14. The term "circumferential corrugations" is intended to signify either successive annular corrugations or a continuous helical corrugation.

The metallic line 12 is made of a material which will not embrittle at a temperature on the order of —259° F., so that it is possible for the liner to handle a liquid such as liquefied natural gas. As is well known the liquefied natural gas will be liquefied at atmospheric pressure when it has a temperature of —259° F.

For this purpose the metallic liner can be made of materials such as a 9% nickel steel, or an 18% chrome and 8% nickel stainless steel. In either case, whether using the latter stainless steel or the 9% nickel alloy, the metal liner is made from tubing which has been mechanically worked during the formation of the corrugations, so that the strength of the metal is increased due to working. The initial tubing for the metallic liner can take the form of a simple cylindrical tube having an elongated welded seam which is heat treated, after the metal sheet is formed into a tube and welded, so as to remove all stresses, particularly around the weld. The metal of the tube at this time is relatively thin and the material of the tube is such that it is capable of being expanded in the manner indicated in FIG. 5. Thus, as is shown in FIG. 5, the metal tube 16 which subsequently will form the liner 12 is situated in a die, such as a steel die 18. This die has inner circumferential corrugations 20 and either through hydraulic pressure or through the pressure of an explosion, as indicated by the arrows 22, the tube 16 is expanded against the corrugations 20 of the die 18, so as to form the metal liner in this way.

The expansion of the tube 16 by hydraulic or explosive energy against the inner surface of the corrugated die 18 will form the smooth corrugations 14 of finished liner 12 and in addition will cold work the material so as to provide it with maximum strength. The size and shape of the corrugations are calculated so as to provide maximum burst resistance while still retaining longitudinal flexibility.

In addition to straight pipe sections, elbows and other connections, such as T's and Y's, are made in a similar way.

It is also possible to manufacture the inner metallic liner from a high strength alloy sheet which is cold-formed so as to be provided with a series of corrugations which extend longitudinally of the sheet, although if the sheet is relatively narrow it may have only one continuous corrugation extending along the sheet or strip. Then this latter sheet or strip, which has thus been corrugated by cold-forming, is wound into a spiral form with the convolutions of the spiral having adjoining edges which are welded to each other so as to form a continuous tube. In this case, the amount of cold work and the size of the corrugations are predetermined to provide the metallic liner which is manufactured in this way with the maximum burst resistance while still retaining longitudinal flexibility.

Returning now to FIG. 1, the metallic liner 14 is surrounded by a temperature-resistant layer of insulation 24, preferably made of foamed polyurethane and surrounding and directly engaging the metallic liner 12. While the metallic liner will retain the liquid and resist the bursting pressure of the static and hydraulic forces of the liquid, the insulation 24 will prevent heat losses so that the liquid will be reliably maintained at the desired low temperature.

The layer of insulation 24 is substantially thicker than the relatively thin-walled metallic liner 14, as is apparent from FIG. 1. This layer of insulation 24 is surrounded by a protective sheath 26 which preferably is in the form of a fiber glass reinforced plastic, such as a phenol formaldehyde resin. The layer of polyurethane foam 24 may be applied to the liner 14 by being sprayed thereon, and subsequently the thus sprayed layer of insulation 24 is shaved to a smooth surface. Then the reinforced plastic sheath 26 is placed over or formed directly on the insulation 24. An alternate and preferable way to apply the insulation is by pouring the foamable mixture in the void space between the liner 14 and the sheath 26 as they are maintained in spaced co-axial relationship.

Figure 2:
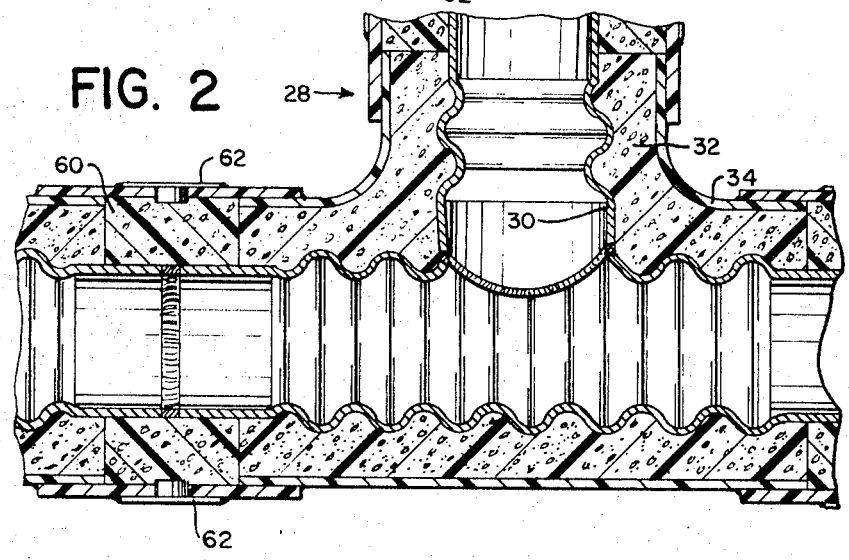
FIG. 2 is a longitudinal section illustrating how a T-section is joined to other pipe sections.

As may be seen from FIG. 2, a T pipe section 28 has the same construction in that it is composed of a circumferentially corrugated metallic liner 30 surrounded by the layer of foamed polyurethane insulation 32 which in turn is surrounded by the protective reinforced plastic sheath 34 which in this case is a split covering so that it can conveniently be placed on the T section 28.

As was indicated above, the reinforced plastic sheath 26 protects the layer of insulation from crushing and soil damage and also it acts as a barrier against penetration of moisture into the layer of insulation.

Figure 3:
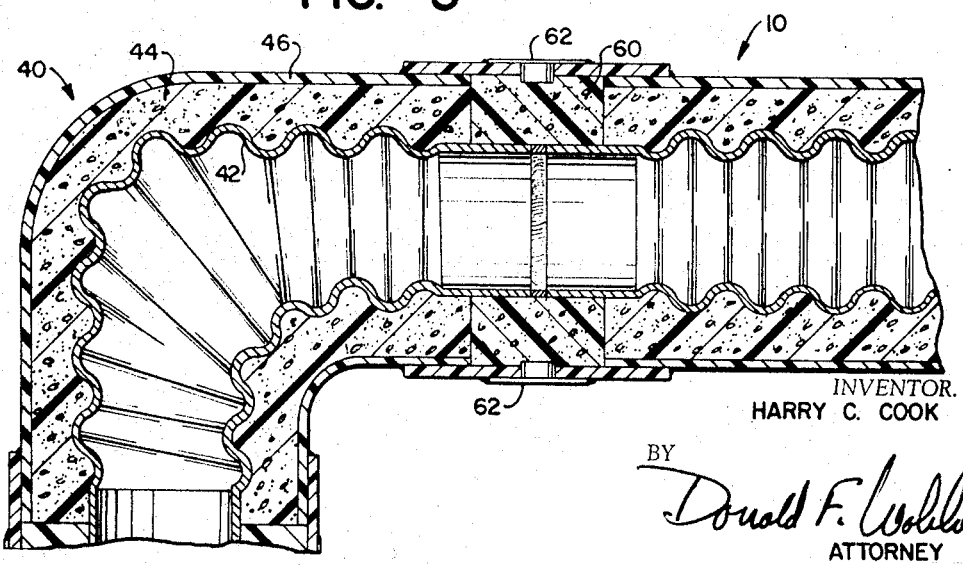
FIG. 3 is a longitudinal section elevation showing an elbow section of the pipe of the invention and the manner in which it is joined with successive pipe sections.

Referring to FIG. 3, it will be seen that the pipeline 10 can also include an elbow section 40 having an inner metallic liner 42 which is also circumferentially corrugated. The liner 42 is surrounded by the foamed polyurethane insulation 44 which can be applied in the same way as the other sections, and this insulation layer 44 is protected by the outer reinforced plastic sheath 46.

Referring to FIG. 4A, the pipe sections 50 shown therein are prefabricated and are transported to the location where they are to be situated, either beneath the surface of the ground or beneath the surface of a body of liquid. These pipe sections 50 at this time have the construction referred to above. It will be noted, however, that the metallic liners 12 have corrugation free cylindrical ends 52 projecting beyond the adjoining ends of the insulation 24 and protective sheath 26. When a pair of pipe sections are to be joined to each other, a sleeve 54 is first slipped onto one of the pipe sections, in this case the right pipe section 50 of FIG. 4A. This sleeve 54 is made of the same material as the protective sheath 26 and has a snug sliding fit on the exterior cylindrical surface of the sheath 26 of the right pipe section 50 of FIG. 4A.

With the pipe sections in the position shown in FIG. 4A the exposed protruding ends 52 are welded to each other at their extremities.

In this way the two pipe sections are joined to each other at their metallic liners. Then, after a suitable cement has been applied to the exterior surfaces of the protective sheaths 26 at the region of the free ends thereof, the sleeve 54 is shifted to the position shown in FIG. 4B so that it will be tightly fused with the layer 24 by the cement, and in this way the sleeve 54 is fixed in position where it forms a substantial continuation of the protective sheaths 26 and where it surrounds the void space 56 situated between the insulating layer 24 and surrounding the welded liner ends 52. The sleeve 54 is formed with one or more openings 58, and when the parts have the position shown in FIG. 4B, a filling of additional insulating material is injected as a foamable liquid into the lowermost hole 68. As the foam expands it will fill the void 56. If sufficient foam has been introduced, a small amount will come out the top hole 58 which may be removed with a knife. This filling 60 is shown in FIGS. 1 to 3 at the several joints between the successive pipe sections. The filling 60 is preferably also of a foamed polyurethane which is simply introduced through the opening 58 when the pipe sections have been situated at their ultimate locations.

Once the space 56 has been filled with the insulation, the opening 58 is closed by a plastic patch or plug 62, and in this way the connection between adjoining pipe sections is completed.

While specific embodiments of the invention have been shown and described in detail to illustrate the application of the inventive principles, it will be understood that the invention may be embodied otherwise without departing from such principles.

What is claimed is:

1. The method of manufacturing a section of pipe for the transportation of cryogenic liquids, comprising the steps of, forming a relatively thin walled, corrugated liner from low temperature resistant metallic material such as 9% nickel steel, spraying a relatively thick layer of polyurethane foam insulation on the exterior of said liner, shaving the exterior of the foam insulation to form a smooth surface, and thereafter forming a plastic sheath directly upon said foam insulation to form a vapor barrier thereover.

2. The method of claim 1, wherein the corrugated liner is formed by hydraulic expansion.

3. The method of claim 1, wherein the last mentioned step includes forming the plastic sheath from a fiber glass reinforced phenol formaldehyde resin.

References Cited

UNITED STATES PATENTS

| | | |
|---|---|---|
| 2,372,917 | 4/1945 | Tuttle. |
| 2,857,931 | 10/1958 | Lawton. |
| 2,960,142 | 11/1960 | Cimochowski. |
| 3,136,049 | 6/1964 | Throner et al. _____ 29—421 X |

FOREIGN PATENTS

| | | |
|---|---|---|
| 7,990 | 3/1897 | Great Britain. |
| 2,925,514 | 8/1929 | Great Britain. |

CHARLIE T. MOON, *Primary Examiner.*

U.S. Cl. X.R.

29—455, 458, 460, 529; 138—149; 285—286